United States Patent [19]
Rhodes

[11] Patent Number: 5,066,740
[45] Date of Patent: Nov. 19, 1991

[54] PYRIDINIUM METATHESIS CATALYSTS FOR CYCLOOLEFIN POLYMERIZATION

[75] Inventor: Larry F. Rhodes, Cuyahoga Falls, Ohio

[73] Assignee: The B. F. Goodrich Company, Akron, Ohio

[21] Appl. No.: 457,042

[22] Filed: Dec. 26, 1989

[51] Int. Cl.$^5$ .............................................. C08F 4/78
[52] U.S. Cl. .................................. 526/160; 526/114; 526/116; 526/127; 526/128; 526/132; 526/161; 526/282; 526/283; 264/328.6; 264/331.17
[58] Field of Search ............... 526/160, 161, 281, 283, 526/128, 129, 114, 115, 132, 116, 282; 264/328.6, 331.17

[56] References Cited

U.S. PATENT DOCUMENTS

| | | | |
|---|---|---|---|
| 4,380,617 | 4/1983 | Minchak et al. | 526/283 X |
| 4,426,502 | 1/1984 | Minchak | 526/281 X |
| 4,923,936 | 5/1990 | Goodall et al. | 526/161 X |
| 4,923,939 | 5/1990 | Goodall | 526/161 |

*Primary Examiner*—Fred Teskin
*Attorney, Agent, or Firm*—George A. Kap; Thoburn T. Dunlap

[57] ABSTRACT

This invention pertains to the use of pyridinium isopoly and heteropoly molybdates and tungstates as catalysts in a metathesis catalyst system in polymerization of norbornene-type monomers by ring opening polymerization. Polymerization can be by reaction injection molding in absence of a solvent whereby a thermoset polymer is produced or by solution polymerization in presence of a suitable solvent whereby a thermosetting or a thermoplastic polymer is produced. The monomers are selected from polycycloolefins containing at least on enorbornene group and mixtures thereof.

20 Claims, No Drawings

PYRIDINIUM METATHESIS CATALYSTS FOR CYCLOOLEFIN POLYMERIZATION

BACKGROUND OF THE INVENTION

Ring opening polymerization with a metathesis catalyst system of cycloolefins is well known. The cycloolefins for purposes herein are selected from monocycloolefins which contain 3 to 9 carbon atoms and which contain 1 to 4 double bonds, and polycycloolefins which contain a norbornene group. The metathesis catalyst system includes a catalyst and a cocatalyst. The catalyst is generally selected from molybdenum and tungsten compounds whereas the cocatalyst is selected from organometallics such as alkylaluminums, alkyltins, alkylaluminum halides, aryloxyalkylaluminum halides, and alkoxyalkylaluminum halides.

U.S. Pat. No. 4,400,340 to Klosiewicz describes a tungsten-containing catalyst such as tungsten halide or tungsten oxyhalide. The catalyst is suspended in a solvent to prevent it from prepolymerizing a monomer to which is added an alcoholic or a phenolic compound to facilitate solubilization of the tungsten catalyst in the monomer and a Lewis base or a chelant to prevent premature polymerization of the solution of the tungsten compound and the monomer. Treatment of the tungsten compound should be carried out in the absence of moisture and air to prevent deactivation of the tungsten compound catalyst. The catalyst must be treated in the manner outlined above in order to render it soluble in the cycloolefin monomer. The cocatalyst in this patent is disclosed as being selected from tetrabutyltin and alkylaluminum compounds such as alkylaluminum dihalide or dialkylaluminum halide where the alkyl group contains 1 to 10 carbon atoms. The preferred alkyl group is ethyl with diethylaluminum chloride being the most preferred cocatalyst. These cocatalysts are sensitive to air and moisture but are readily soluble in the cycloolefin monomers.

U.S. Pat. No. 4,380,617 to Minchak et al discloses metathesis catalyst systems for polymerizing cycloolefins. The catalysts are defined as organoammonium isopolymolybdates and organoammonium isopolytungstates and these catalysts are soluble in cycloolefins and are insensitive to air and moisture. The cocatalysts in this patent are similar to the cocatalysts disclosed in U.S. Pat. No. 4,400,340 and are generally selected from organometallics, particularly alkylaluminum halides although in a less preferred embodiment, other metals can be used in place of aluminum such as lithium, magnesium, boron, lead, zinc, tin, silicon, and germanium. Also, metallic hydrides can be used in whole or in part for the organometallic cocatalysts. Alkylaluminum and the corresponding organometallic compounds can also be used as cocatalysts herein.

U.S. Pat. No. 4,426,502 discloses the use of alkoxyalkylaluminum halides or aryloxyalkylaluminum halides as cocatalysts in metathesis catalyst systems to polymerize cycloolefin monomers. These cocatalysts are disclosed as especially useful in conjunction with organoammonium isopolytungstate and isopolymolybdate catalysts in polymerization of cycloolefins or norbornene-type monomers. By modifying the alkylaluminum halide cocatalysts to alkoxy or aryloxy alkylaluminum halides, the reducing power of the cocatalysts is thus lowered to provide adequate pot life for mixing various ingredients at room temperature, and for work interruptions, before initiation of polymerization and subsequent rapid polymerization.

Organoammonium isopolymolybdate and isopolytungstate catalysts contain molybdenum oxide or tungsten oxide anions, respectively, whereas organoammonium heteropolymolybdates or heteropolytungstate catalysts contain at least one other hetero atom in addition to molybdenum or tungsten.

SUMMARY

Polymerization of cycloolefins by ring opening is accomplished in the presence of a metathesis catalyst system composed of substituted pyridinium heteropoly or isopoly molybdate or tungstate catalyst and a metathesis cocatalyst. Suitable cycloolefins herein are monocycloolefins containing 3 to 9 carbon atoms in the cyclic structure and 1 to 4 double bonds therein, except cyclohexene, polycycloolefins which contain at least one norbornene group, and mixtures thereof. Polymerization proceeds by ring opening and results in a polymer which has unsaturation in the backbone.

DETAILED DESCRIPTION OF THE INVENTION

This invention resides in the use of a substituted pyridinium heteropoly or isopoly molybdate or tungstate catalyst in the ring opening polymerization of cycloolefin monomers. Depending on the number of carbon atoms in the substituents on the pyridine ring, these catalysts can be soluble in hydrocarbon solvents and in the cycloolefin monomers. Cocatalysts selected from organometallic compound and other ingredients are used in conjunction with the novel catalysts disclosed herein to polymerize the cycloolefins by solution or bulk polymerization.

Suitable isopoly molybdate and/or tungstate catalysts are defined by formula I as follows:

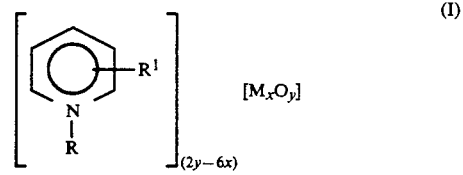

(I)

Suitable heteropoly molybdate and/or tungstate catalysts are defined by formulas II, III and IV as follows:

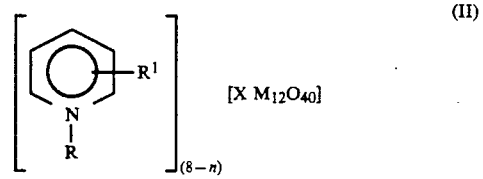

(II)

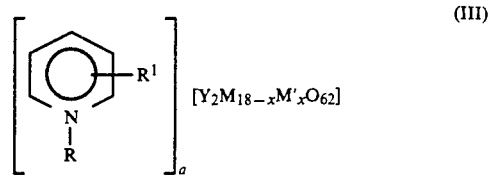

(III)

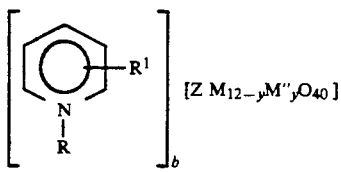

$$[Z\ M_{12-y}M''_yO_{40}]_b \quad (IV)$$

where:

R and $R^1$ are individually selected from alkyl groups, alkylene groups, cycloaliphatic groups wherein the sum of the carbons in all R and $R^1$ radicals should be large enough so that the molecule is soluble in the cycloolefin monomer(s). There can be up to five $R^1$ groups on the pyridine ring, preferably up to 3, especially one. The $R^1$ radicals can occupy positions 2, 3, 4, 5 and 6 on the pyridine ring, preferably positions 3, 4 and 5. The R radical is preferably selected from alkyl groups containing 1 to 50 carbon atoms, preferably 10 to 40 carbon atoms. The $R^1$ radicals are preferably individually selected from alkyl groups containing 1 to 40 carbon atoms, preferably 2 to 30 carbon atoms. All of the R and $R^1$ radicals should not be small in the number of carbon atoms since such a condition will render the catalyst molecule essentially insoluble in hydrocarbons and in the polycycloolefin norbornene-type monomer(s);

X = elements and mixtures of such elements of Groups IB, IIB, IIIA, IVA, IVB, VA, and VIII but preferably phosphorus, silicon, boron, germanium, arsenic, titanium, and zirconium in their highest oxidation states;

M = molybdenum, tungsten, and mixtures thereof;
M' = vanadium, niobium, but preferably vanadium;
M" = vanadium, niobium, and rhenium;
Y = phosphorus, arsenic, and mixtures thereof;
Z = phosphorus, silicon, and mixtures thereof;
n = highest oxidation state for the hetero atom, wherein n for the preferred hetero atoms is a positive number given below:
phosphorus = 5
silicon = 4
boron = 3
germanium = 4
arsenic = 5
titanium = 4
zirconium = 4
a = 16 + 6x − m'x − 2n
b = 8 + 6y − ym" − n
y = number of M" metal ions
x = number of M' metal ions
m' = highest oxidation state of M' (5 for vanadium, and 5 for niobium);
m" = highest oxidation state of M" (5 for vanadium, 5 for niobium, and 7 for rhenium);

The hetero atoms include only elements in Groups IB, IIB, IIIA, IVA, IVB, VA, and VIII of the Periodic Table but preferably phosphorus (P), silicon (Si), boron (B), germanium (Ge), arsenic (As), titanium (Ti), and zirconium (Zr). Group IB elements include copper, silver, and gold; Group IIB elements include zinc, cadmium, and mercury; Group IIIA elements include boron, aluminum, gallium, indium, and thallium; Group IVA elements include carbon, silicon, germanium, tin, and lead; Group IVB elements include titanium, zirconium, and hafnium; Group VA elements include nitrogen, phosphorus, arsenic, antimony, and bismuth; and Group VIII elements include iron, ruthenium, osmium, cobalt, rhodium and iridium.

Formula I catalysts include tetra[eicosyl 4-(1-butylpentyl)pyridinium]octamolybdate, which has the following formula corresponding to formula I, above:

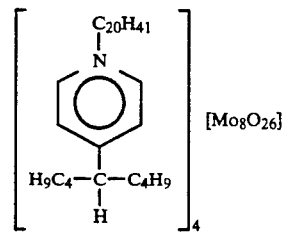

Formula II catalysts include tricetylpyridinium[1-phospho-12-tungstate] which is commercially available in powder form and has the following formula corresponding to formula II, above:

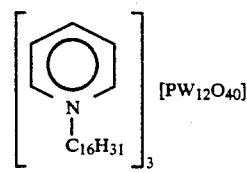

Formula III catalysts include hexa[docosyl-4-(13-pentacosyl)pyridinium]-2-phospho-18-molybdate, which has the following formula corresponding to formula III, above:

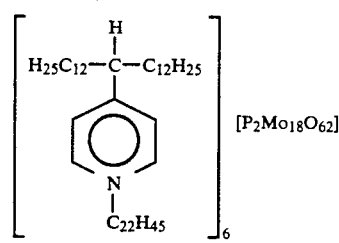

Formula IV catalysts include penta[docosyl-4-(13-pentacosyl) pyridinium] phospho-2-vanado-10-molybdate, which has the following formula corresponding to formula IV above:

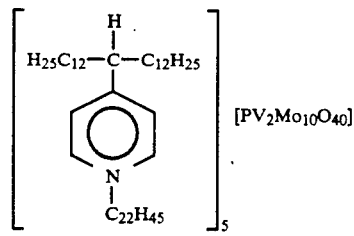

The molybdenum or tungsten metals of the heteropoly catalysts disclosed herein can be optionally substituted with metals of Group VB and VIIB selected from vanadium, niobium, and rhenium, but preferably vanadium. These complexes can be synthesized according to F. Ortega et al., *Inorg. Chem.* 1984, 23, 3292–3297 and G.A. Tsigdinos et al., *Inorg. Chem.* 1968, 7, 437–441.

In a metathesis catalyst system, a catalyst component is used in conjunction with a cocatalyst component to initiate a ring opening polymerization of cycloolefins containing a norbornene group or norbornene-type monomer(s). The cocatalyst component is selected from organometallics, organometallic halides organometallic oxyhalides and mixtures thereof, preferably alkylaluminums and alkylaluminum halides.

The alkylaluminum halides suitable herein as cocatalysts are selected from monoalkylaluminum dihalides $RAlX_2$, dialkylaluminum monohalides $R_2AlX$, aluminum sesquihalides $R_3Al_2X_3$, trialkylaluminum $R_3Al$, aluminum trihalide $AlX_3$, and mixtures thereof. In the formulas for the alkylaluminum halide catalysts, R is an alkyl radical containing 1 to 12 carbon atoms, preferably about 2 to 4 carbon atoms, and X is a halogen selected from chlorine, iodine, bromine and fluorine. Specific examples of such alkylaluminum halides include ethylaluminum dichloride, diethylaluminum monochloride, ethylaluminum sesquichloride, diethylaluminum iodide, ethylaluminum diiodide, trialkylaluminum compound with elemental iodine, propylaluminum dichloride, propylaluminum diiodide, isobutylaluminum dichloride, ethylaluminum dibromide, methylaluminum sesquichloride, and methylaluminum sesquibromide.

Also suitable herein are alkylaluminum halides selected from alkoxyalkylaluminum halides and aryloxyalkylaluminum halides defined by the following formula:

$(RO)_a R'_b AlX_c$ where R is an alkyl or a phenyl radical containing about 1 to 18 carbon atoms; R' is an alkyl radical containing 1 to 18 carbon atoms; X is a halogen selected from chlorine, iodine, bromine and fluorine; "a" is the number of equivalents of the alkoxy or aryloxy moiety (RO—) and can vary from a minimum of about ½ to a maximum of about 2½, preferably from 1 to 1¾; "b" is the number of equivalents of the alkyl group ($R^1$) and can vary from a minimum of about ¼ to a maximum of about 2, preferably from ½ to 1; and "c" is the number of equivalents of halogen X and can vary from a minimum of 0 to a maximum of about 2, preferably from ¾ to 1¼. The sum of a, b, and c equals 3.0.

The molybdate and tungstate catalyst components of this invention, or mixtures thereof, are employed at a level of 0.01 to 50 millimoles of molybdenum or tungsten and the heteropoly atoms(s) per mole of total monomer, preferably 0.1 to 10 millimoles. The molar ratio of the cocatalyst to the catalyst is not critical and can range from about 200:1 or more to 1:10, preferably 50:1 to 2:1 of aluminum or the corresponding metal to the combined amount of molybdenum or tungsten and the heteropoly atom(s).

Suitable cycloolefins herein include monocycloolefins and polycycloolefins which contain at least one norbornene group The monocycloolefins contain 3 to 9 ring carbon atoms, preferably 5 to 8, and 1 to 4 double bonds. Examples of monocycloolefins suitable herein include cyclopentene, cycloheptene, cyclooctatriene and the like. Suitable monocycloolefins, however, exclude 6-membered cyclic hydrocarbons such as cyclohexene, methylcyclohexene and other substituted cyclohexenes.

The norbornene-type monomers or the polycycloolefins that can be polymerized in accordance with the process described herein are characterized by the presence of the norbornene group, defined structurally by the following formula I:

(I)

Pursuant to this definition, suitable norbornene-type monomers include substituted and unsubstituted norbornenes, dicyclopentadienes, dihydrodicyclopentadienes, trimers of cyclopentadiene, and tetracyclododecenes. Contemplated herein are also lower alkyl norbornenes and lower alkyl tetracyclododecenes wherein the lower alkyl group contains 1 to about 6 carbon atoms.

Examples of preferred polycycloolefin monomers referred to herein include dicyclopentadiene and oligomers of dicyclopentadiene, particularly trimers and tetramers of cyclopentadiene; methyltetracyclododecene; 2-norbornene and other norbornene monomers such as 5-methyl-2-norbornene, 5,6-dimethyl-2-norbornene, 5-ethyl-2-norbornene, 5-butyl-2-norbornene, 5-hexyl-2-norbornene, 5-octyl-2-norbornene, and 5-dodecyl-2-norbornene; vinyl norbornene; and ethylidene norbornene.

In solution polymerization, a hydrocarbon reaction solvent is mixed with a cycloolefin monomer or a mixture thereof, with or without other polymerizable monomers and the mixture of the monomer and solvent is charged into a reactor. A molecular weight modifier selected from nonconjugated acyclic olefins is then charged into a reactor followed by at least one organometallic or alkylaluminum halide cocatalyst and at least one molybdate or tungstate catalyst described herein. The reaction can be conducted at 0° to 100° C., preferably 20° to 80° C., or at ambient temperature and carried out to completion in less than two hours. The reaction can be shortstopped by addition of an alcohol. The resulting product is a smooth, viscous polymer cement. Upon removal of the solvent, the polymer is a thermoplastic, solid material.

Solution polymerization requires presence of a solvent. Suitable solvents for solution polymerization include aliphatic and cycloaliphatic hydrocarbon solvents containing 4 to 10 carbon atoms such as pentane, hexane, heptane, octane, cyclohexane, cyclohexene, cyclooctane and the like; aromatic hydrocarbon solvents containing 6 to 14 carbon atoms which are liquid or easily liquified such as benzene, toluene, naphthalene and the like; and substituted hydrocarbons wherein the substituents are inert, such as dichloromethane, chloroform, chlorobenzene, dichlorobenzene, and the like. Cyclohexane was found to be an excellent solvent. The polymer need not be soluble in the solvent. The solvent may be added at any point in the charging procedure, but a portion, preferably 0.1 to 10% of the total solvent, is used to dissolve the catalyst and the remainder added before the catalyst solution. Generally, ½ to 2 liters of solvent is used per 100 grams of monomer.

A solution polymerization activator may be used but is not generally needed. Excellent activation can be obtained by using air or a peroxide or a hydroperoxide as the activator, especially by using the organic peroxides such as benzoyl peroxide. The activator may be employed in a range from about 0 moles to about 3 moles per mole of the cocatalyst, more preferably from about 0 to about 1 mole per mole. The activator may be added at any point in the charging procedure but it is more preferably added last, or with the catalyst.

The nonconjugated acyclic olefin used as a molecular weight modifier has at least one hydrogen on each double-bonded carbon atom and containing 2 to 12 carbon atoms, more preferably 3 to 8 carbon atoms. Compounds not having hydrogen atoms substituted on double-bonded carbons are unreactive in this reaction.

The nonconjugated acyclic olefin can be used in a molar ratio to total monomer charge of from about 0.0001 to about 1 mole per mole of the monomer charge. The nonconjugated acyclic olefin can be charged directly or in solution at any point in the charge procedure, but it is more preferably charged along with the monomers. When charged last, the nonconjugated acyclic olefin is preferably charged before reaction begins.

The monomers can be added at any point in the charging procedure. Normally, however, the monomers, solvent and nonconjugated acyclic olefin are added first to the reactor vessel. These ingredients can be added separately or as a mixture of ingredients. Next, the cocatalyst and the catalyst are added separately, usually in the hydrocarbon solvent described above. The catalyst component of this invention is added following addition of the cocatalyst component although the order can be reversed. Completion of the polymerization reaction is indicated by the disappearance of the monomer in the charge, as monitored by gas chromatography.

Bulk polymerization is carried out in absence of a solvent by polymerizing cycloolefin monomer or a mixture thereof by means of a metathesis catalyst system wherein the catalyst component is the molybdate or tungstate of this invention. The monomer can be formed into a hard, thermoset object in a single step by means of reaction injection molding (RIM) Process wherein polymerization takes place in a mold. Examples of such objects include business machine housings, furniture, window frames, automobile and recreation vehicle parts, and the like.

Since the heteropoly metallate and the isopolymetallate catalysts described herein can be made soluble in a norbornene-type monomer or a mixture thereof, the polymerization can be carried out in absence of a solvent and other additives used in solution polymerization. The cocatalysts are also soluble in such monomers. This, of course, facilitates polymerization in bulk and makes it possible to polymerize the norbornene-type monomer(s) by reaction injection molding process.

If the cocatalyst does not contain any halide or if more halogen is desired, then a halogen source is used. Halogen source such as a halosilane is used in amount of 0.05 to 10 millimoles per mole of the cycloolefin monomer, preferably 0.1 to 2 millimoles per mole of the monomer. Specific examples of preferred halogen source are chlorosilanes such as dimethylmonochlorosilane, dimethyldichlorosilane, diphenyldichlorosilane, tetrachlorosilane, and the like. In bulk polymerization such as reaction injection molding process, conversion of in excess of 95%, preferably in excess of 98% can be attained, measured by the thermal gravimetric procedure.

In order to further illustrate the invention described herein, the following examples are presented that demonstrate certain aspects of the invention herein in greater detail. It is to be understood, however, that the examples are presented for illustrative purposes and not in any sense are to limit the scope of the invention herein, the scope of which is defined by the appended claims.

EXAMPLE 1

This example illustrates preparation of a catalyst that corresponds to formula I, above, i.e., an isopolymetallate octamolybdate of the following formula:

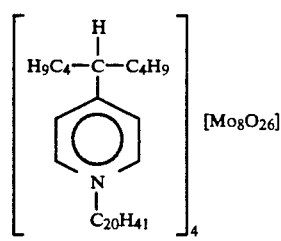

The catalyst is tetra[eicosyl-4-(1-butylpentyl)-pyridinium] octamolybdate. In preparation of this catalyst, the pyridinium chloride is first made by the following method according to the following formula:

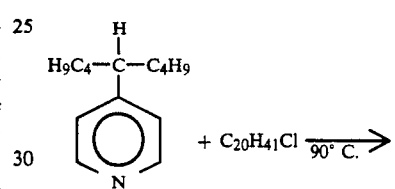

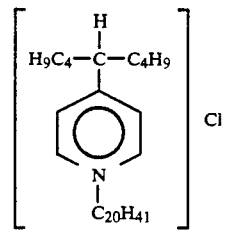

Solid 1-chloroeicosane (3.09g) and liquid 4-(1-butylpentyl) pyridine (2.00g) were heated to 90° C. in a sealed reaction flask. The reaction was monitored by Proton NMR. Upon completion (about 20 days) the resulting solid was stirred in heptane until a biege material began to appear. The solid was filtered and dried in vacuo overnight. Proton NMR analysis showed Production of pure pyridinium chloride.

The chloride salt was then reacted with the ammonium molybdate as shown below to yield the catalyst

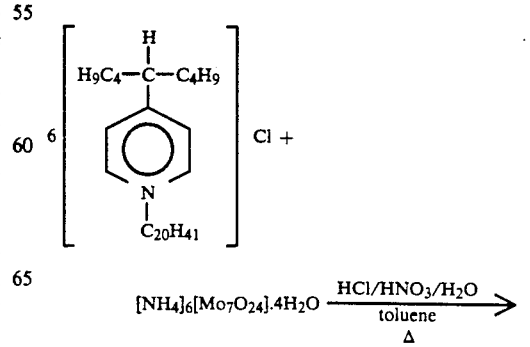

-continued

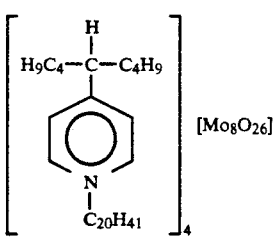

The heptamolybdate (0.20g) was dissolved in deionized water (~30ml) in a round bottom flask. To this mixture was added a small amount of HCl:HNO$_3$ (10%) solution such that the pH of the resulting solution was around 2. A layer of toluene (~10ml) was added to the solution and a toluene solution (~30ml) of the pyridinium chloride (0.50g) was added. The mixture was refluxed for about 1 hour. After cooling, the organic layer was separated from the water layer and washed with deionized water three times. The organic layer was then dried over molecular sieves overnight. Toluene was removed from the organic layer by rotovaporation to give an oily brown residue which gave IR bands consistent with the presence of the octamolybdate [Mo$_8$O$_{26}$]$^{4-}$.

EXAMPLE 2

This demonstrates preparation of an isopolymolybdate catalyst mixture conforming to formula I above.

The pyridinium chloride salt was prepared in a manner similar to that described in Ex. 1 according to the following formula

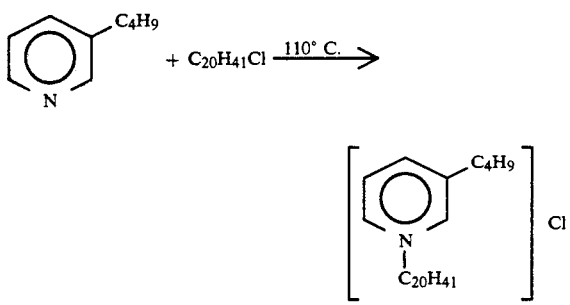

Equimolar amounts of 3-butyl pyridine and 1-chloro eicosane were heated to 110° C. in a sealed flask for 6 days to yield a yellow solid after cooling to room temperature.

The isopolymolybdate catalyst mixture was prepared by reacting the ammonium molybdate with the pyridinium salt as shown below:

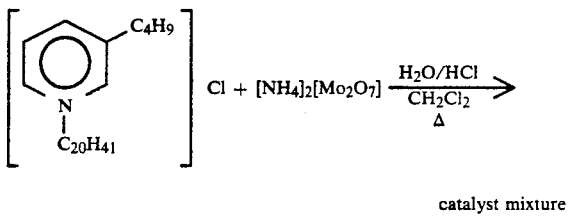

catalyst mixture

Pursuant to the procedure generally outlined above, 0.91 g of the ammonium molybdate was dissolved in about 100 ml of acidic (HCl) deionized water while 1.00 g of the pyridinium salt was dissolved in 100 ml of methylene chloride. The two solutions were placed in 500-ml round bottom flask and refluxed for one half hour after condenser was secured to the flask.

Before refluxing started, the bottom methylene chloride layer became bright yellow and stayed that way during the reflux.

After cooling the flask contents, the methylene chloride layer was separated from the water layer. Methylene chloride was removed on the rotovap to yield a waxy yellow solid. Further drying of the solid on the rotovap at 50° C. for 30 minutes yielded 1.32 gram of a yellow-green solid catalyst.

EXAMPLE 3

This example illustrates the preparation of a heteropolymetallate catalyst which corresponds to formula III, above. The catalyst was prepared according to the following formula:

[NH$_4$]$_6$[P$_2$Mo$_{18}$O$_{62}$]·nH$_2$O +

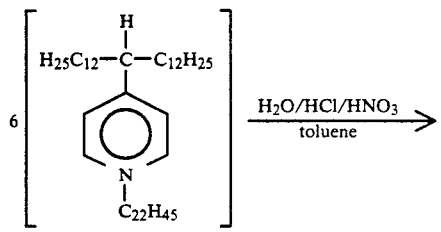

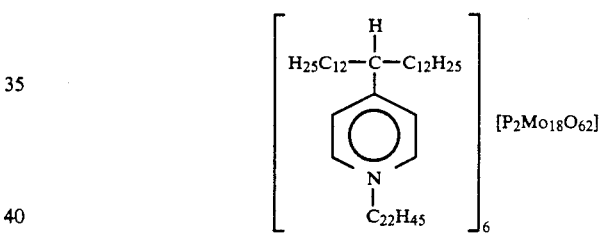

The molybdenum reagent (0.41g) was dissolved in deionized water (~30ml) and placed in a round bottom flask. 2-3 drops of a HCl:HNO$_3$ (20:1) solution was added to the water solution. About 20 ml of toluene was added to this yellow solution. To this clear yellow two-phased system was added a toluene solution (~30ml) of the pyridinium chloride (0.70g). The mixture became cloudy and was refluxed for about 30 minutes. The deep yellow toluene layer was separated from the colorless water layer and dried overnight over molecular sieves.

The toluene was then removed by rotovaporation. The resulting yellow solid was then dried in vacuo. The yellow solid was characterized by infrared analysis.

This pyridinium heteropolymetallate catalyst, which is soluble in warmed dicyclopentadiene, is expected to be a suitable metathesis catalyst for polymerizing a monomer containing at least one norbornene group, or a mixture of such monomers.

EXAMPLE 4

This example illustrates the preparation of a heteropolymetallate catalyst which corresponds to formula IV, above. The catalyst was prepared according to the following formula:

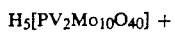

H$_5$[PV$_2$Mo$_{10}$O$_{40}$] +

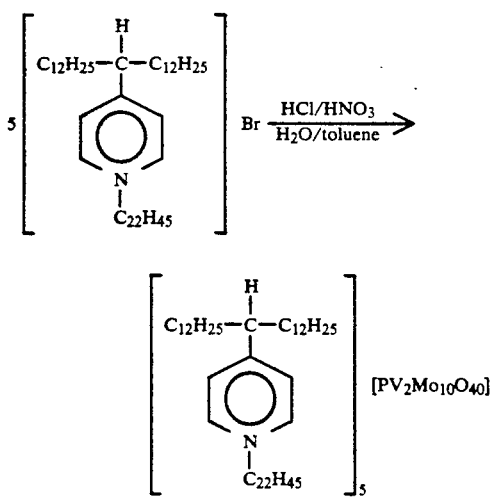

The molybdate compound (1.00g) was dissolved in about 30 ml of deionized water and placed in a round bottom flask yielding a green solution. Addition of 2-3 drops of acid (HCl:HNO₃ 20:1) gave a solution with a pH <2. About 10 ml of toluene was added to the aqueous solution yielding a two-phase system. The pyridinium bromide (1.74 g) was dissolved in about 20 ml of toluene which was subsequently added to the two-phase solution. After refluxing the solution with vigorous stirring for 30-45 minutes, the organic layer became green and the aqueous layer essentially colorless. The organic layer was separated from the aqueous layer and washed twice with deionized water. The green organic solution was then dried over molecular sieves. After about two hours the solution took on a yellowish tinge. Removal of the toluene by rotovaporation yielded a dark yellow-green solid which was scraped from the flask. Infrared analysis of the isolated material was consistent with the presence of $[PV_2Mo_{10}O_{40}]^{5-}$.

This pyridinium mixed metal heteropolymetallate, which is soluble in warmed dicyclopentadiene, is expected to be a suitable metathesis catalyst for polymerizing a monomer containing at least one norbornene group, or a mixture of such monomers.

EXAMPLE 5

(a) This example illustrates polymerization using the catalyst prepared as in Ex. 1 which corresponds to formula I.

In the formulations given below, silicon tetrachloride (SiCl₄) was used in the form of a 0.5 molar solution in 92.5/7.5 weight parts dicyclopentadiene/ethylidenenorbornene (DCPD/ENB), which was a 92.5/7.5 weight mixture of the monomers. The cocatalyst was diethylaluminum chloride (DEAC) and was used in the form of a 0.5M solution in DCPD/ENB. N-propanol was used in the form of a 1.0M solution in DCPD/ENB. The catalyst was used in the form of a 0.0125N solution in DCPD/ENB.

Approximately 1.35 ml of the n-propanol solution was added to 46.4g of DCPD/ENB in a pop bottle under nitrogen. DEAC solution (2.0 ml) was then added followed by 2.25 ml of SiCl₄ solution and 5.66 ml of the warmed catalyst solution. After about two minutes the solution began to gel and finally formed a hard polymeric plug.

(b) This example illustrates polymerization using the catalyst mixture prepared as in Ex. 2 which corresponds to formula I.

The pyridinium molybdate catalyst mixture (0.1g) was dissolved in a warmed solution of 40 ml of DCPD/ENB in a nitrogen degassed pop bottle. To this yellow solution was added 2.0 ml SiCl₄ solution followed by 2.0 ml of 0.5M DEAC solution. A dark polymeric solid results almost immediately upon addition of the DEAC.

EXAMPLE 6

This example demonstrates ring-opening polymerization of a 92.5/7.5 weight mixture of dicyclopentadiene (DCPD) and ethylidenenorbornene (ENB) using the heteropolymetallate catalyst which corresponds to formula II, above.

In the formulations given below, silicon tetrachloride (SiCl₄) was used in the form of a 0.25 molar solution in DCPD/ENB, which was a 92.5/7.5 weight mixture of the monomers. The cocatalyst was diethylaluminum chloride (DEAC) and was used in the form of 0.50 molar solution in DCPD/ENB.

The catalyst of this invention was 0.1N tricetylpyridinium(1-phospho-12-tungstate) solution in methylene chloride. The catalyst is commercially available in powder form.

The following formulation was prepared under nitrogen in a pop bottle:

| | |
|---|---|
| 92.5/7.5 DCPD/ENB (g) | 40.0 |
| DEAC, 0.50 M (ml) | 1.0 |
| SiCl₄, 0.25 M (ml) | 1.0 |
| Catalyst (ml) | 1.0 |

Upon addition of the catalyst as the last component, the bottle was placed in an 80° C. oil bath. After 10 minutes, the solution in the bottle turned blue and after additional 15 minutes, polymerization took place as evidenced by a dark blue hard solid in the bottle apparently of medium conversion.

I claim:

1. A process for preparing a polymer by ring opening polymerization in the presence of a metathesis catalyst system, said process comprising the steps of polymerizing a monomer charge comprising a norbornene-type monomer, or a mixture thereof, in the presence of an effective amount of a metathesis catalyst component selected from the group consisting of substituted pyridinium heteropolymolybdates, substituted pyridinium isopolymolybdates, substituted pyridinium heteropolytungstates, substituted pyridinium isopolytungstate, and mixtures thereof, and an effective amount of a metathesis cocatalyst component, and said norbornene-type monomer is selected from polycycloolefins which contain at least one norbornene group.

2. Process of claim 1 wherein said norbornene-type monomer is characterized by the presence of at least one norbornene group defined as follows:

and said cocatalyst component is selected from organometallic compounds, organometallic halide compounds, organometallic oxyhalide compounds, and mixtures thereof.

3. Process of claim 1 wherein said norbornene-type monomer is characterized by the presence of at least one norbornene group defined as follows:

and said cocatalyst component is selected from alkylaluminum, alkylaluminum halides, alkoxyalkylaluminum halides, arloxyalkylaluminum halides, and mixtures thereof.

4. Process of claim 3 wherein said cocatalyst component is selected from alkoxyalkylaluminum halides, aryloxyalkylaluminum halides, and mixtures thereof.

5. Process of claim 4 wherein said cocatalyst component is selected from compounds defined by the following formula:

$$(RO)_a R'_b AlX_c$$

where R is selected from alkyl and aryl groups containing 1 to 18 carbon atoms; R' is an alkyl group of 1 to 18 carbon atoms; X is a halogen; and (a), (b) and (c) represent equivalents of RO, R' and X, respectively, where (a) is about ½ to 2½, (b) is about ¼ to 2, and (c) is about 0 to 2 and the sum of (a), (b) and (c) is 3.

6. Process of claim 5 wherein in reference to said cocatalyst, the R group is selected from alkyl groups of 2 to 4 carbon atoms and R' group also contains 2 to 4 carbon atoms.

7. Process of claim 6 wherein said norbornene-type monomer is selected from substituted and unsubstituted 2-norbornenes, dicyclopentadienes, ethylidene norbornene, dihydrodicyclopentadienes, trimers of cyclopentadienes, tetramers of cyclopentadienes, tetracyclododecenes, and mixtures thereof.

8. Process of claim 6 wherein said norbornene-type monomer is selected from norbornene, lower alkyl norbornenes, ethylidene norbornene, vinyl norbornene, dicyclopentadiene, trimers of cyclopentadiene, tetramers of cyclopentadiene, tetracyclododecene, alkyltetracyclododecenes containing 1 to 3 carbon atoms in each alkyl group, and mixtures thereof.

9. Process of claim 1 wherein said catalyst component is selected from metallate compounds defined by the following formulas I, II, III and IV:

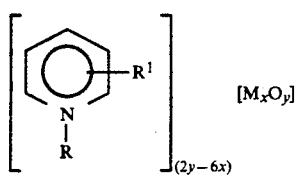

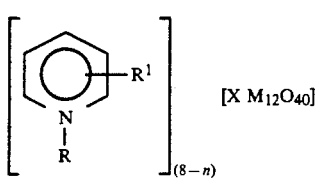

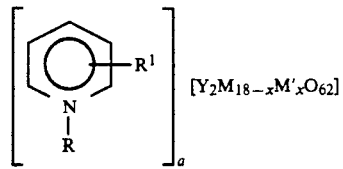

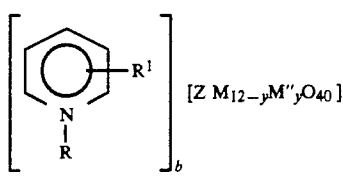

where: R and R¹ are individually selected from alkyl, alkylene, and cycloaliphatic groups wherein the sum of the carbons in all R and R¹ radicals is large enough so that said catalyst component is soluble in said norbornene-type monomer;

X = elements and mixtures of elements of Groups IIIA, IVA, IVB, and VA;
M = molybdenum, tungsten, and mixtures thereof;
M' = vanadium, niobium and mixtures thereof;
M" = vanadium, niobium, rhenium and mixtures thereof;
m' = highest oxidation state of M' (5vanadium, and 5 for niobium);
m" = highest oxidation state of M" (5 for vanadium, 5 for niobium, and 7 for rhenium);
Y = phosphorus, arsenic, and mixtures thereof
n = highest oxidation state of X:
Z = phosphorus, silicon, and mixtures thereof
a = 16 + 6x − m'x − 2n
b = 8 + 6y − ym" − n
y = number of M" metal ions
x = number of M' metal ions.

10. Process of claim 9 wherein in formula II, X is selected from phosphorus, silicon, boron, germanium, arsenic, titanium, and zirconium; and wherein in formula IV, M" is vanadium.

11. Process of claim 10 wherein amount of said catalyst component is 0.01 to 50 millimoles of said metal(s) in said catalyst per mole of said monomer(s) and molar ratio of said cocatalyst component to said catalyst component is in the range of 200:1 to 1:10 of aluminum to said metal(s) in said catalyst.

12. Process of claim 5 wherein said catalyst component is selected from compounds defined by the following formulas I, II, III and IV:

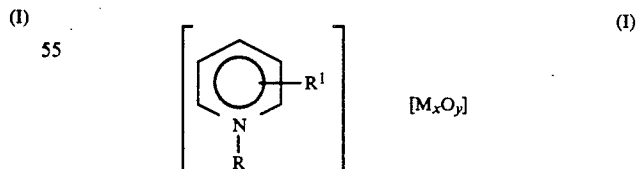

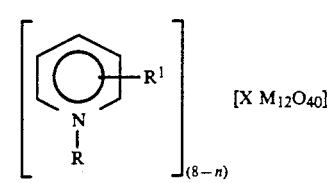

-continued

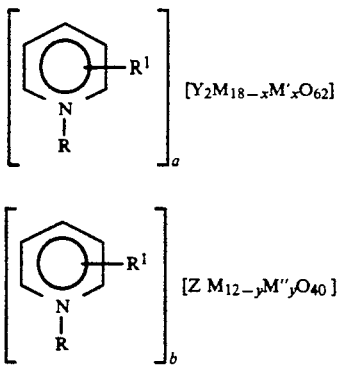

$[Y_2M_{18-x}M'_xO_{62}]_a$ (III)

$[Z M_{12-y}M''_yO_{40}]_b$ (IV)

where: R and R¹ are individually selected from alkyl groups of 2 to 30 carbons, wherein the sum of the carbons in all R and R¹ is large enough so that the catalyst component is soluble in the cycloolefin monomer(s):

X = elements and mixtures of elements of Groups IIIA, IVA, IVB, and VA in their highest oxidation states, and mixtures thereof;

M = molybdenum, tungsten, and mixtures thereof;

M' = vanadium, niobium, and mixtures thereof;

M" = vanadium, niobium, rhenium, and mixtures thereof;

m' = highest oxidation state of M' (5 for vanadium, and 5 for niobium);

m" = highest oxidation state of M" (5 for vanadium, 5 for niobium, and 7 for rhenium);

Y = phosphorus, arsenic, and mixtures thereof;

n = highest oxidation sate of X;

Z = phosphorus, silicon, and mixtures thereof;

$a = 16 + 6x - m'x - 2n$ $b = 8 + 6y - ym'' - n$ y = number of M" metal ions x = number of M' metal ions.

13. Process of claim 12 wherein in formula II, X is selected from phosphorus, silicon, boron, germanium, arsenic, titanium, and zirconium; and wherein in formula IV, M" is vanadium.

14. Process of claim 13 wherein said catalyst component is used at a level of 0.1 to 10 millimoles per mole of monomer; and wherein molar ratio of said cocatalyst component to said catalyst component is in the range of about 50:1 to 2:1.

15. Process of claim 13 which also includes the step of adding a halogen source in amount of 0.1 to 2 millimoles per mole of said monomer(s), said halogen source is selected from chlorosilanes.

16. Process of claim 15 wherein said halogen source is selected from dimethylmonochlorosilane, dimethyldichlorosilane, diphenyldichlorosilane, tetrachlorosilane, and mixtures thereof.

17. Process of claim 15 which includes the step of mixing multiple streams containing said catalyst, said cocatalyst, said halogen source, and said monomer(s) to produce a reactive mixture, and the step of injecting said reactive mixture into a mold where said polymerization takes place to produce a thermoset polymer.

18. Process of claim 17 wherein conversion of said polymer is at least 95%, measured by thermal gravimetric analysis.

19. Process of claim 13 wherein said norbornene-type monomer is selected from alkyl-2-norbornenes containing 1 to 6 carbon atoms in each alkyl group, dicyclopentadienes, ethylidene norbornene, dihydrodicyclopentadienes, trimers of cyclopentadienes, tetramers of cyclopentadienes, tetracyclododecene and alkyl tetracyclododecenes containing 1 to 6 carbon atoms in each alkyl group, and mixtures thereof.

20. Process of claim 13 conducted in the presence of an effective amount of a hydrocarbon solvent.

* * * * *